Oct. 16, 1962 G. CHRISTIANSON 3,058,830
METHOD OF SEPARATING LIQUID FAT FROM MEAT FIBERS
Filed Nov. 9, 1959 2 Sheets-Sheet 1
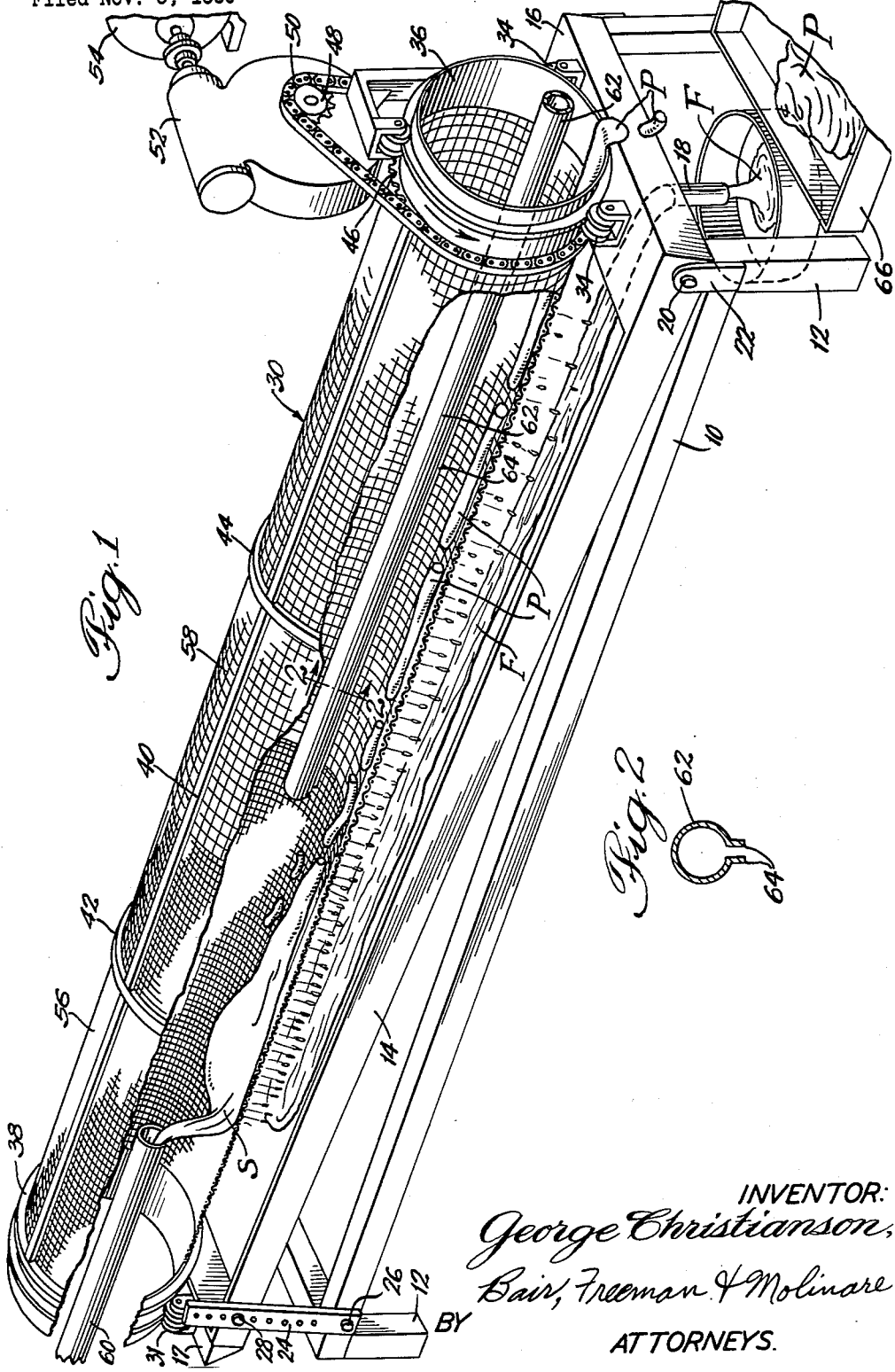
INVENTOR:
George Christianson,
Bair, Freeman & Molinare
BY
ATTORNEYS.

Oct. 16, 1962   G. CHRISTIANSON   3,058,830
METHOD OF SEPARATING LIQUID FAT FROM MEAT FIBERS
Filed Nov. 9, 1959   2 Sheets-Sheet 2
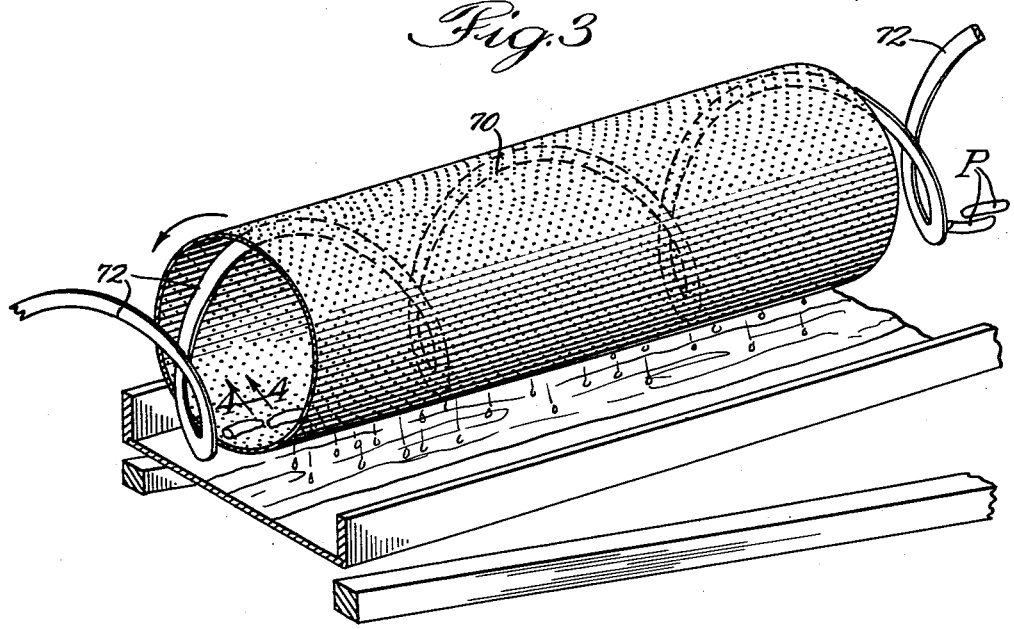
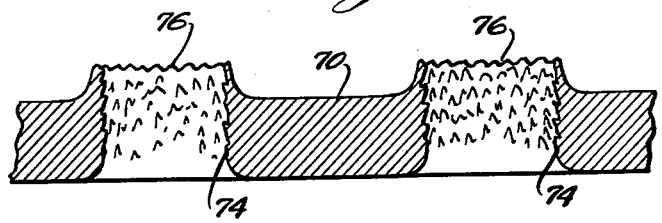
INVENTOR:
George Christianson,
BY Bair, Freeman & Molinare
ATTORNEYS.

United States Patent Office 3,058,830
Patented Oct. 16, 1962

3,058,830
METHOD OF SEPARATING LIQUID FAT FROM MEAT FIBERS
George Christianson, Waterloo, Iowa, assignor to The Rath Packing Company, Waterloo, Iowa, a corporation of Iowa
Filed Nov. 9, 1959, Ser. No. 851,640
4 Claims. (Cl. 99—108)

This invention relates to a method and apparatus for separating lean protein from fat in meat products. The invention finds particular use in conjunction with a process for recovering lean meat from meat trimmings. The trimmings removed from various cuts of meat are severed manually with a knife and unavoidably include lean as well as the fat which is being removed. These trimmings may contain as much as 50% lean. Until rather recently it has been the practice in the art to separate the fat from the lean manually, using a knife. It has now been proposed to effect this separation by finely comminuting the fat trimmings, which contain from about 7% to about 25% lean meat, to produce an emulsion. This emulsion is then heated to the melting point of the fat whereupon the emulsion breaks to provide a slurry of meat fibers dispersed in liquid fat. The last step in the process consists in removing the molten fat from the particles or fibers of protein and this is normally accomplished in a centrifuge. Although centrifuges are satisfactory insofar as effecting separation is concerned, they represent a substantial capital investment and the amount of material processed is relatively small compared to their size.

The method of the present invention is useful in performing the last step of the aforesaid process, i.e. separating the comminuted meat fibers from the fat. In accordance with the invention, this is accomplished at low cost and the separation effected is substantially complete. As a result, the protein remaining is high quality and comprises a major proportion of the end product. As used in this specification and in the appended claims, the term "protein" refers to lean red meat, including lesser quantities of connective tissue, fat cell walls and moisture normally found in these materials. Furthermore, the method is continuous and is capable of processing large quantities of slurry in a short time. The uncooked protein material is agglomerated to form a unitary mass, ready for use in meat products such as sausage.

The apparatus of the invention is relatively inexpensive to build and is capable of treating the slurry continuously. It is rugged and foolproof in its operation, and occupies relatively small space for the amount of material treated.

Broadly, the invention comprises discharging the protein-fat slurry onto a rotating foraminous surface, e.g. a sieve, a screen or perforated plate, to cause agglomeration of the protein particles. The molten fat drains through the screen and is recovered for further treatment or packaging. The screen may be inclined to advance the partially agglomerated protein particles from one end to the other. It is highly unexpected that the pores of the screen remain free of the fibrous protein particles where these pores are fine enough to prevent passage of the particles therethrough. It appears that the molten fat coats the screen and prevents adhesion. Under such conditions the protein particles have a greater affinity for each other than for the screen and agglomeration takes place. The present process and apparatus depend for their success on this basic principle.

It appears that increased efficiency in the process is provided by utilizing an apparatus having two sizes of sieves for the screen—a fine sieve of approximately 60 mesh for receiving the slurry initially and a coarse sieve of approximately 20 mesh for effecting the final separation after the particles have been partially agglomerated. When partial agglomeration has taken place, particles are large enough so that they do not pass through the 20 mesh screen and as a result the fat may be drained off much more rapidly.

In a preferred form of the invention the foraminous surface is cylindrical and rotates about its axis. The protein slurry is charged into the cylinder, and the screen becomes coated with the highly fluid molten fat. As the screen rotates, the fibrous protein particles agglomerate and partial separation is effected in the fine screen area. Agglomeration continues progressively as the protein particles advance to the discharge end of the cylinder from which the completely agglomerated material is discharged in a unitary mass. In order to insure complete separation of the molten fat from the protein, means is provided toward the coarse screen, discharge end, of the cylinder for heating the fat to keep it thoroughly liquid and simultaneously to remove any of the liquid fat which is adhered to the surface of the agglomerated protein. This is preferably accomplished by blowing a hot gas on the agglomerated material. The fat is blown through the relatively coarse openings in the screen.

Suitable apparatus for performing the process of the invention is illustrated in the accompanying drawings, wherein:

FIGURE 1 is a perspective view of the apparatus of the invention;

FIGURE 2 is a sectional view taken along the line 2—2 of FIGURE 1;

FIGURE 3 is a perspective view of a section of a modified cylinder in which the solids move upwardly; and FIGURE 4 is an enlarged sectional view taken along line 4—4 of FIGURE 3.

It will be appreciated that although preferred forms of apparatus for carrying out the invention are described herein, various modifications may be made and will be apparent to those skilled in the art. The apparatus is mounted on a frame having horizontal members 10 and vertical legs 12 which rest on the floor. A trough 14 is supported directly by the frame. A drain pipe 18 is located at the lowermost point in the bottom of the trough. The lower end of the trough is pivotally mounted by means of pins 20 which project through openings in tabs 22 which are welded and project above the frame 10. The opposite end of the trough may be elevated to various heights by means of the arm members 24 which are pivotally secured to the frame at the lower ends by pins 26. The arms 24 have a plurality of longitudinally spaced openings therethrough which are adapted to receive a pin 28, the inner end of which seats in an opening provided in the side of the trough 14.

The cylindrical screen 30 is mounted on rollers at either end. Rollers 31 support the elevated end and rollers 34 support the lower end. The rollers in turn are journalled in yokes mounted on cross members 17 and 16 supported by the trough. The cylindrical screen 30 terminates at either end in a collar 36, 38 having a circumferential flange or bead which rides in a complementary groove in the rollers 31, 34. Extending between the collars is a frame comprising longitudinal support members 40 and circumferential support members 42, 44 to which the screens 56 and 58 are secured by welding or other convenient means.

The rotating cylindrical screen 30 is driven by means of sprocket 46 and a chain 50 through a speed reducer 52 having a small sprocket 48 over which the chain is trained. The speed reducer in turn is driven by an electric motor 54. By this means the rate at which the screen rotates may be controlled.

The slurry to be separated is pumped into the cylinder through conduit 60 which has its discharge end disposed within the cylinder at its elevated end. Hot gas is blown onto the agglomerated protein particles through a conduit 62 disposed within the cylindrical screen 30 near its lower or discharge end. The conduit 62 has a slot in the bottom thereof indicated at 64 through which hot pressurized gas is directed on the agglomerated protein in the bottom of the cylinder. The conduit 62 is about one-half as long as the cylinder 30 and will effectively heat most of the material in the coarse-screen end of the cylinder. The end of the conduit 62 which is cut off in the drawing is connected to a source of hot gas such as air, nitrogen or other inert gas.

Although the cylinder 30 is illustrated with two sizes of screen it will be appreciated that it can be constructed with a screen having the same mesh continuously along its length. By using the fine screen at the receiving end and the coarse screen at the discharge end, it is possible, however, to effect separation much more rapidly. Thus, the length of the cylinder may be substantially reduced. The size of the screen openings is not critical. The finer the sieve, the slower the separation. On the other hand, the coarser the screen the more likelihood of losing the small fiber particles prior to agglomeration. The sieve or screen 56 is preferably about 60 mesh and may range up to about 80. The screen or sieve 58 is preferably about 20 mesh and may range down to about 10.

The slurry S consisting of very fine fibers or particles of protein matter dispersed in molten fat is discharged from the conduit 60 onto the fine screen 56. The liquid fat coats the screen so that the protein particles have no affinity therefor. Having great affinity for each other, micro-size particles agglomerate while the liquid fat F flows through the screen into the trough 14. The fat collected in the trough flows to the lower end and is discharged through the drain pipe 18 into a suitable container, or it may be pumped from the pipe 18 to a vat for further treatment while it is in molten condition. As the screen rotates, the fibrous particles continue to agglomerate to macro size, forming a larger and larger mass which in the rotating cylindrical apparatus takes the form of an agglomerated protein rope P. As the agglomerated particles in the rope pass under the conduit 62, hot air is blown on them under considerable pressure through slot 64 to blow off the fat on the surface and at the same time raise the temperature of the fat so that it remains highly fluid. The agglomerated, protein matter, relatively free of liquid fat, is discharged from the end of the cylinder into a suitable container 66.

Although the screen shown in the drawing is cylindrical in form, it will be appreciated that a flat screen may be used, providing it is mounted on a suitable mechanism for imparting motion thereto for the purpose of effecting agglomeration of the protein particles. The motion also causes the agglomerated particles to clean the screen by moving across the surface thereof and forming a mass of agglomerated particles. The direction of the motion may be rotary or reciprocative or a combination of the two.

The cylinder 30 is preferably rotated at a speed of between 20 and 30 revolutions per minute, and its slope may range from zero to about 30°, preferably about 20°. The over-all length of the cylindrical screen is about twelve feet in the form shown in the drawing. This apparatus is capable of processing approximately 7,000–10,000 pounds of slurry per hour with a yield of 2,000 to 3,000 pounds of solids. Normally it would take three centrifuges of 8,000 pounds rated input capacity to produce this quantity of solids in the same time. With high yields of lean, say 30%, this centrifuge will throw out quantities of solids in excess of about 10% with the fat when fed at the rate of 8,000 pounds per hour.

The comminuted material which is conducted into the cylindrical screen through the pipe 60 may be prepared continuously by comminuting in a Fitzmill or a Rietz cutter to produce a very finely divided mixture of fat and protein. This material may then be passed through a votator to raise the temperature and cause the fat to melt. The emulsion then breaks to form the slurry of fibrous protein particles in liquid fat. This is the material that is finally discharged into the present apparatus. If desired, the agglomerated protein discharged from the end of the screen, after having been separated from the fat, may be passed directly through another votator which is operated at low temperatures for cooling the protein.

A modified form of cylinder is illustrated in FIGURE 3. The cylinder 70 is prepared from a sheet of porous metal, as for example #00 staggered hole 30 gauge stainless steel sheet. The inner surface of the cylinder carries a helical ribbon 72 which advances the solids from one end of the cylinder to the other. This type of cylinder is preferably mounted with the discharge end in elevated position. Thus, the fat flows down as the solids move up to effect complete separation.

It will be noted from FIGURE 4 that the holes 74 having a relatively jagged margin 76 on the inner surface thereof, are produced by punching the holes in the sheet metal. Even after grinding these edges remain relatively rough, and serve to catch the solid fibers and prevent them from flowing through the opening with the fat. In this manner, the fibers are held within the cylinder until they agglomerate.

Various other modifications in the process will occur to those skilled in the art. It is my intention to include any such modifications which reasonably may be deemed to fall within the scope of the appended claims.

What I claim as new and desire to secure by Letters Patent of the United States is:

1. In a process for recovering lean protein from meat trimmings including fat which comprises comminuting the trimmings to produce an emulsion, heating the emulsion to melt the fat without cooking the protein, and causing the emulsion to break into a slurry of fibrous protein particles dispersed in liquid fat, the improvement which comprises charging said slurry onto a foraminous surface, imparting a rolling motion to said surface, bringing the protein particles into repeated contact with each other by reason of said rolling motion to cause them to be lifted from the surface and agglomerated into a mass of increasingly larger size as the protein particles advance over said surface, and simultaneously causing the fat to drain through the openings in said surface, maintaining said fat in a fluid state during agglomeration, and discharging the agglomerated mass from said surface.

2. The process of claim 1 in which said slurry is continuously charged on said foraminous surface at one end and said agglomerated mass is continuously discharged from said surface at the other end.

3. The process of claim 1 in which said foraminous surface constitutes a rotating cylindrical screen.

4. The process of claim 3 in which said particles agglomerate to form a rope-like mass.

References Cited in the file of this patent

UNITED STATES PATENTS

| | | |
|---|---|---|
| 434,696 | Binder | Aug. 19, 1890 |
| 1,845,893 | Sommermeyer | Feb. 16, 1932 |
| 1,930,091 | Halvorson et al. | Oct. 10, 1933 |
| 2,194,862 | McDonald | Mar. 26, 1940 |
| 2,551,042 | Nyrop | May 1, 1951 |
| 2,571,555 | Fernandes | Oct. 16, 1951 |
| 2,673,790 | Illsley | Mar. 30, 1954 |
| 2,697,112 | Kramer | Dec. 14, 1954 |
| 2,820,804 | Gordon | Jan. 21, 1958 |

Disclaimer 3,058,830.—*George Christianson*, Waterloo, Iowa. METHOD OF SEPA-
RATING LIQUID FAT FROM MEAT FIBERS. Patent dated
Oct. 16, 1962. Disclaimer filed Oct. 19, 1966, by the assignee, *The Rath
Packing Company*.
Hereby enters this disclaimer to claim 2 of said patent.
[*Official Gazette February 7, 1967.*]